United States Patent
Wong

(10) Patent No.: US 6,849,986 B2
(45) Date of Patent: Feb. 1, 2005

(54) END CAP ASSEMBLY

(75) Inventor: Ben To Fan Wong, Hong Kong (CN)

(73) Assignee: Johnson Electric S.A., La Chaux-de-Fonds (CH)

( * ) Notice: Subject to any disclaimer, the term of this patent is extended or adjusted under 35 U.S.C. 154(b) by 0 days.

(21) Appl. No.: 10/721,095

(22) Filed: Nov. 26, 2003

(65) Prior Publication Data
US 2004/0104639 A1 Jun. 3, 2004

(30) Foreign Application Priority Data
Nov. 30, 2002 (GB) .............................................. 0228010

(51) Int. Cl.⁷ .............................................. H02K 13/00
(52) U.S. Cl. ...................................... 310/239; 310/241
(58) Field of Search ................................ 310/239, 240, 310/241, 242, 248, 148

(56) References Cited

U.S. PATENT DOCUMENTS

| | | | | |
|---|---|---|---|---|
| 1,375,658 A | * | 4/1921 | Gilchrist ..................... 310/239 |
| 3,480,813 A | * | 11/1969 | Sillano ........................ 310/241 |
| 3,792,298 A | | 2/1974 | Hamman ..................... 310/239 |
| 3,875,495 A | * | 4/1975 | Middlebrook ................ 363/32 |
| 5,023,532 A | * | 6/1991 | Gakenholz .................. 318/541 |
| 5,661,357 A | * | 8/1997 | Iijima ......................... 310/239 |
| 2002/0057025 A1 | | 5/2002 | Lehir et al. .................. 310/91 |
| 2002/0141672 A1 | | 10/2002 | Lau ............................ 384/420 |

FOREIGN PATENT DOCUMENTS

| EP | 0 359 603 A1 | 3/1990 | ........... H02K/5/14 |
| EP | 0 986 163 A1 | 3/2000 | ........... H01R/39/38 |
| FR | 2 819 643 A1 | 7/2002 | ........... H01R/39/38 |
| GB | 1 537 567 A | 12/1978 | |

* cited by examiner

Primary Examiner—Dang Le
Assistant Examiner—Nguyen N Hanh
(74) Attorney, Agent, or Firm—Birch, Stewart, Kolasch & Birch, LLP

(57) ABSTRACT

An end cap 16 for a miniature electric pmdc motor has two fixed brush cages 36, 38 moulded integrally with the end cap and two separate brush cages 40, 42 which are attached to the end cap 16 during the assembly process. The angular separation of the fixed brush cages 36, 38 and the separate brush cages 40, 42 is determined during assembly so that the angle can be adjusted to suit the application of the motor.

12 Claims, 2 Drawing Sheets

END CAP ASSEMBLY

CROSS-REFERENCE TO RELATED APPLICATIONS

This non-provisional convention application claims priority under the Paris convention and 35U.S.C.§119(a) from British patent application number 0228010.5 filed in U.K. on Nov. 30, 2002.

BACKGROUND OF THE INVENTION

This invention relates to electric motors and in particular, to an end cap for a pmdc motor.

Two speed pmdc motors are known where the speed change is obtained by using a three brush construction where one brush is common and the other two brushes are selectively used for low speed or high speed operation.

The low speed brush is generally located 180° opposite the common brush and the high speed brush is located between the other two brushes, generally about 90° from the common brush. Such an arrangement works well for a single direction motor but for a two speed bi-directional motor, there is a big difference in the no load speed between clockwise and counterclockwise high speed operation. This has been generally tolerated as a failing of a two speed pmdc bi-directional motor.

Attempts to correct this undesirable characteristic include the use of two high speed brushes, one for each direction, resulting in a four brush system. This provides a satisfactory solution but the four brushes are fixed to the end cap assembly in predetermined spatial locations. The speed of the motor in high speed mode can be adjusted slightly by changing the angular displacement or location of the high speed brushes with respect to the common brush. As end caps are molded parts with the brush cages being an integral part of the end cap, to change the speed of the high speed mode required a new end cap to be formed requiring a new end cap die, etc.

SUMMARY OF THE INVENTION

Thus, it is desirable for an end cap which can be assembled with two brush cages at fixed locations and having the option to add one or two additional brush cages which can be located within a predetermined angular displacement from the fixed location brush cages.

Accordingly, the present invention provides an end cap assembly for an electric motor comprising: an outer part supporting a bearing and motor terminals; and an inner part having a first brush cage, a second brush cage spaced from the first brush cage by 180°, and provision for locating a third and a fourth brush cage at a desired location circumferentially between the first and second brush cages.

Preferably, the first and second brush cages are integrally molded with the inner part.

Preferably, the third and fourth brush cages are locatable angularly spaced between 75° and 90° from the first brush cage.

Preferably, the third and fourth brush cages (when present) are fixed to the inner part by an epoxy resin or by ultrasonic welding.

Preferably, a detent is formed between the third and fourth brush cages and the inner part which detent radially locates the third and fourth brush cages so that each of the brush cages has a corresponding part located at an equal radial distance from a central axis of the end cap.

Preferably, the detent means comprises projections on an axially outer mating surface of each of the third and fourth brush cages which engage arcuate grooves in an axially inner locating surface of the inner part and the locating surface is juxtaposed the mounting surface of each of the third and fourth brush cages to set the radial distance while allowing the circumferential spacing to be determined during fixing of the third and fourth brush cages to the inner part during assembly.

Preferably, the inner and outer parts have noise suppression components.

Preferably, the noise suppression components of the inner part includes chokes connected to shunts of brushes slidably mounted in the brush cages by way of a link connector which makes a mechanical type connection with the choke.

By using an end cap assembly of this type, the same end cap assembly can be used with all 4 brush configurations, as well as 2 brush and 3 brush configurations which leads to a substantial reduction in inventory, better utilization of parts and standardization of assembly procedures.

BRIEF DESCRIPTION OF THE DRAWINGS

One preferred example of the invention will now be described by way of example only, with reference to the accompanying drawings in which.

DETAILED DESCRIPTION OF THE PREFERRED EMBODIMENT

Figure 1:
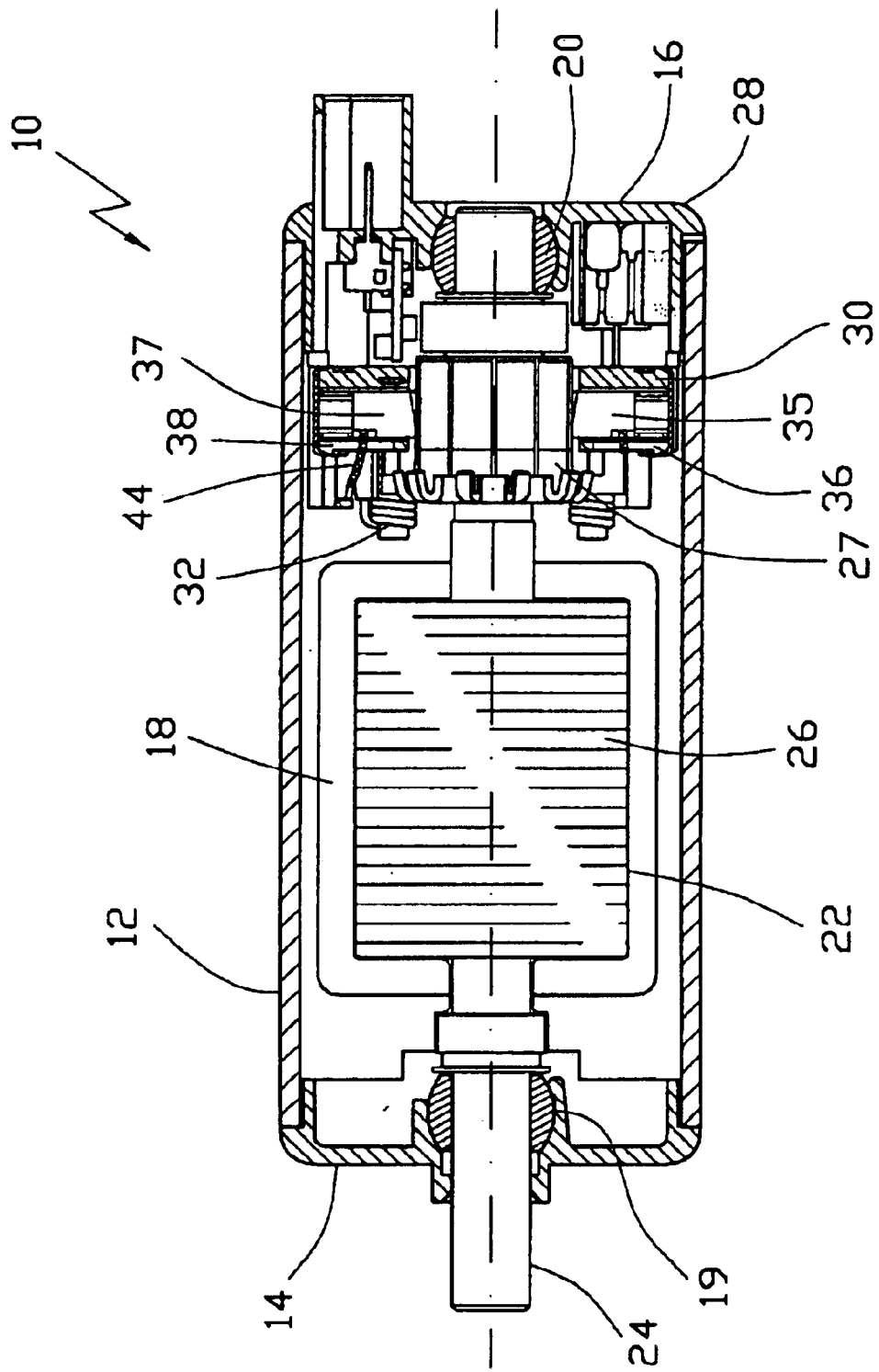
FIG. 1 is a partial sectional view of a miniature electric PMDC motor incorporating an end cap assembly according to the present invention.

FIG. 1 is a partial sectional view of a miniature PMDC motor 10. The motor has a tubular steel housing 12 with two open ends. One end is closed by a single piece moulded plastic or resin material end cap 14 supporting a first bearing 19. The other end of the housing is closed by a two part moulded plastic or resin material end cap 16. End cap 16 also supports a bearing 20. Located within the housing is a rotor 22 comprising a motor shaft 24 journalled in the bearings 19, 20, a rotor core 26 wound with rotor windings (omitted for clarity) and a commutator 27 to which the rotor windings are terminated.

End cap 16 has an outer part 28 and an inner part 30. The outer part 28 supports the bearing 20, motor terminals and noise suppression components. The inner part 30 supports further noise suppression components and the brush gear. The outer and inner parts are held together mechanically by posts on the outer part which are glued or welded (e.g. by ultrasonic welding) onto holes in the inner part. The two parts are electrically connected together by mechanical type connections which grip corresponding connections when the two parts are pressed together.

Figure 2:
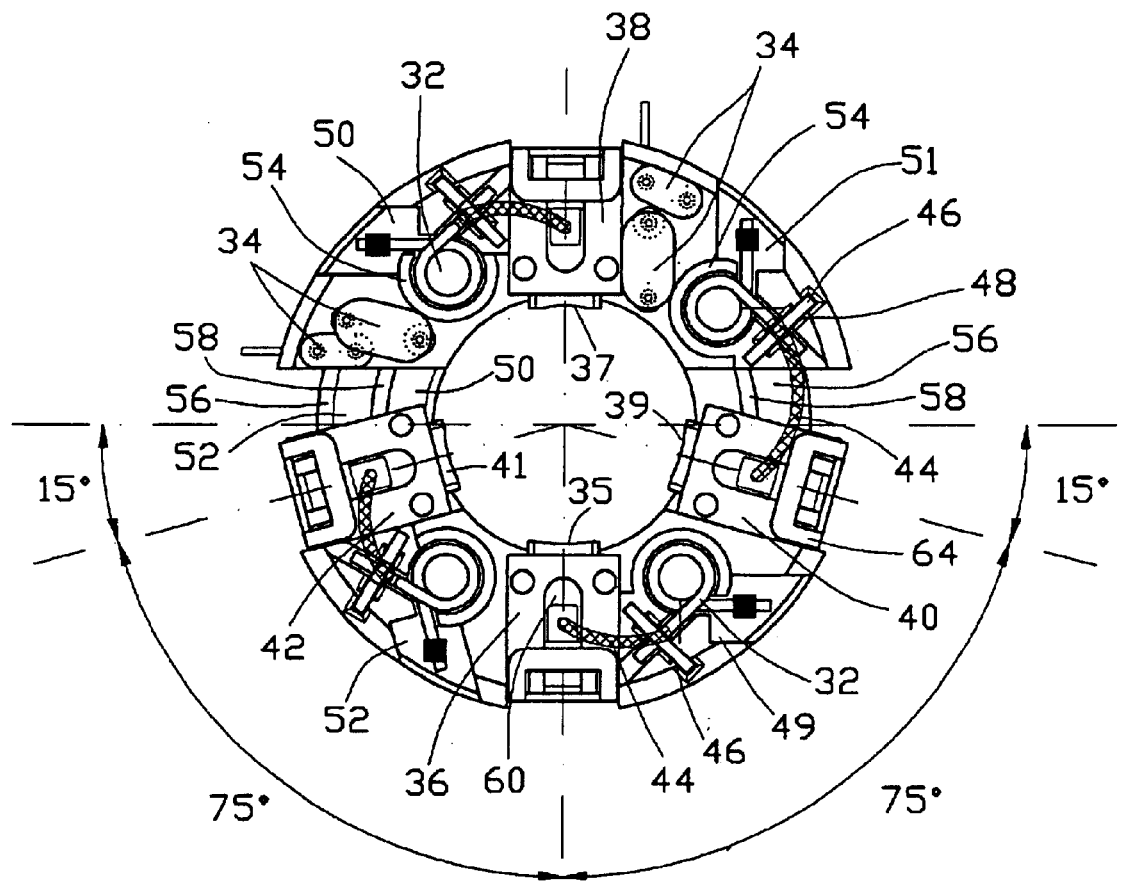
FIG. 2 illustrates an inside view of an inner part of the end cap assembly.

The inner part 30 is shown in plan view in FIG. 2 where four chokes 32 and capacitors 34 of the noise suppression components can be seen. Four brushes 35, 37, 39, 41 and brush cages 36, 38, 40, 42 are also visible. Each brush has a shunt 44 which is welded to a connector plate 46 which has a slot which straddles and grips an end of a choke wire to make electrical connection therewith. The connector plate 46 is located in a recess 48 next to the choke 32 and connection with the choke wire is made as the connector plate 46 is pressed into the recess 48.

Brush 35 and its brush cage 36 is designated as the common brush as it is always connected to the power supply when the motor is operating. Brush 37 is designated the low speed brush as it is connected to the power supply when the motor is operating in the low speed mode, either direction. Brush 39 is designated the high speed clockwise brush as it is connected to the power supply only during high speed clockwise operation and brush 41 is the high speed counterclockwise brush as it is connected to the power supply only during counterclockwise high speed operation.

Brush cages 36 and 38, the common cage and low speed cage, respectively, are integrally moulded into the inner part. The basic inner part 30 is an annular brush card with the two integrally moulded brush cages. Connection buses 49, 50, 51, 52 may be moulded into the brush card with connection terminals extending axially outwardly for connection to the outer part 28 as required. Choke holders 54 are also integrally moulded to the brush card. There are two planar areas or locating surfaces 56, symmetrically located adjacent the common brush cage 36. Each area 56 has an arcuate groove 58. These areas 56 are where the high speed cages 40, 42 are to be located and fixed to the brush card. The high speed brush cages are separate moulded cages which, during assembly, if needed, are fixed to the brush card by known means such as epoxy resin adhesive or ultrasonic welding.

Figure 3:
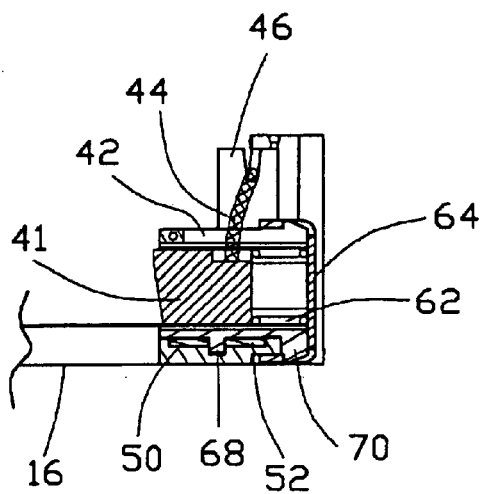
FIG. 3 is a section view through a part of the inner part of FIG. 2.

As shown in FIG. 2 and in FIG. 3, where the high speed CW brush assembly is shown in cross-section, the high speed brush cages 40, 42 have a generally tubular shape with a square cross-section. The axially inner wall of the cage has a slot 60 for the shunt 44 of the brush which is slidably received within the cage and extends radially inwardly under the urgings of a spring 62 bearing against a brass clip 64 closing the radially outer end of the cage. The axially outer surface or mounting surface, the lower surface as shown in FIG. 3, of the cage has a circumferentially extending transverse projection 68 which engages the arcuate groove 58 in the brush card. This sets the precise radial distance of the cage from the motor axis. A further projection 70 at the rear of the cage for attaching the brush clip 64 also assists in locating the cage radially.

The precise circumferential location of the high speed cage 40, 42 with respect to the common brush cage 36 can be set during assembly within the planar area 56. In the embodiment shown, the high speed brush cages 40, 42 can be located within the spatial angles of 75° to 90°. This means that the angle between the radial center line of the common brush and the radial center line of the high speed brush is between 75° and 90°. The radial center line passes through the center of the end cap which corresponds to the rotor axis in use and through the center of the brush/brush cages.

The precise angular positioning can be easily set during assembly using an appropriate assembly jig.

Thus, two, three and four brush end cap assemblies can be produced using a single set of end cap dies and for three and four brush systems, the precise angular displacement of the third and fourth brushes can be varied according to application needs without requiring new dies or parts or other changes to the end cap except as can be arranged during the assembly process.

The embodiment described above is given by way of example only and various modifications will be apparent to persons skilled in the art without departing from the scope of the invention as defined in the appended claims.

What is claimed is:

1. An end cap assembly for an electric motor comprising:
   an outer part supporting a bearing and motor terminals; and
   an inner part having
   a first brush cage, a second brush cage spaced from the first brush cage by 180°, and provision selectively for locating a third and a fourth brush cage at a desired location circumferentially between the first and second brush cages; whereby said end cap is used in any of a single speed motor, a two speed motor and a two speed bi-directional motor by including 2, 3 or 4 brush cages, respectively.

2. An assembly according to claim 1, wherein the first and second brush cages are integrally molded with the inner part.

3. An end cap assembly according to claim 1, wherein the third and fourth brush cages are locatable angularly spaced between 75° and 90° from the first brush cage.

4. An end cap assembly according to claim 1, wherein the third and fourth brush cages are fixed to the inner part by an epoxy resin.

5. An end cap assembly according to claim 1, wherein the third and fourth brush cages are molded resin parts and are joined to the inner part by ultrasonic welding.

6. An end cap assembly according to claim 1, wherein a detent is formed between the third and fourth brush cages and the inner part, which detent radially locates the third and fourth brush cages so that each of the brush cages has a corresponding part located at an equal radial distance from a central axis of the end cap.

7. An end cap assembly according to claim 6, wherein the detent means comprises projections on an axially outer mating surface of each of the third and fourth brush cages which engage arcuate grooves in an axially inner locating surface of the inner part and the locating surface is juxtaposed the mounting surface of each of the third and fourth brush cages to set the radial distance while allowing the circumferential spacing to be determined during fixing of the third and fourth brush cages to the inner part during assembly.

8. An end cap assembly according to claim 1, wherein the inner and outer parts have noise suppression components.

9. An end cap assembly according to claim 8, wherein the noise suspension components of the inner part includes chokes connected to shunts of brushes slidably mounted in the brush cages by way of a link connector which makes a mechanical type connection with the choke.

10. An end cap assembly according to claim 1, wherein said first brush cage holds a common brush, since second brush cage holds a first speed brush, said third brush cage selectively holds a second speed brush for one direction and said fourth brush cage selectively holds a second speed brush for a second direction.

11. An end cap assembly according to claim 10 wherein the third and fourth brush cages are angularly spaced from 75 to 90° from the first brush cage.

12. An end cap assembly for electric motor comprising:
   an end cap;
   a first brush cage for holding a common brush, and molded with the end cap;
   a second brush cage for holding a first speed brush and molded to the end cap;
   a location for a third brush cage for holding a second speed brush for a first direction, said third brush cage being selectively fixed to said end cap;
   a location for a fourth brush cage for holding a second speed brush for a second direction, said fourth brush cage being selectively fixed to the said end cap;
   said end cap assembly selectively including 2, 3 or 4 brushes for use in any of a single speed motor, a two speed motor, and a two speed bi-directional motor.

* * * * *